United States Patent
Kuru

(10) Patent No.: US 7,862,250 B2
(45) Date of Patent: Jan. 4, 2011

(54) DUST BOOT ASSEMBLIES AND APPARATUS FOR PROVIDING GREASE RELIEF FOR A DUST BOOT

(75) Inventor: Koray Kuru, Wayne, NJ (US)

(73) Assignee: Disa Automotive, Inc., Totowa, NJ (US)

(*) Notice: Subject to any disclaimer, the term of this patent is extended or adjusted under 35 U.S.C. 154(b) by 77 days.

(21) Appl. No.: 12/047,556

(22) Filed: Mar. 13, 2008

(65) Prior Publication Data

US 2009/0232589 A1    Sep. 17, 2009

(51) Int. Cl.
F16C 11/06    (2006.01)
(52) U.S. Cl. .................. 403/134; 403/51; 277/635
(58) Field of Classification Search ............. 403/50, 403/51, 134; 277/634, 635
See application file for complete search history.

(56) References Cited

U.S. PATENT DOCUMENTS

| | | | |
|---|---|---|---|
| 2,559,857 A | 7/1951 | Edwards | |
| 3,135,539 A | 6/1964 | Ulderup et al. | |
| 3,175,834 A | 3/1965 | Wallace et al. | |
| 3,208,779 A * | 9/1965 | Sullivan, Jr. | 403/134 |
| 3,248,955 A | 5/1966 | Templeton | |
| 3,391,952 A * | 7/1968 | Zeigler | 403/51 |
| 3,476,417 A * | 11/1969 | Born et al. | 403/134 |
| 4,121,844 A | 10/1978 | Nemoto et al. | |
| 4,979,844 A | 12/1990 | Teramachi | |
| 5,308,284 A | 5/1994 | Renzo et al. | |
| 5,568,930 A | 10/1996 | Urbach | |
| 5,649,779 A | 7/1997 | Martin et al. | |
| 5,782,574 A | 7/1998 | Henkel | |
| 5,813,789 A | 9/1998 | Prickler et al. | |
| 5,947,627 A | 9/1999 | Uneme et al. | |
| 6,139,788 A | 10/2000 | Dorr | |
| 6,152,640 A | 11/2000 | Oda et al. | |
| 6,254,114 B1 | 7/2001 | Pulling et al. | |
| 6,308,959 B1 | 10/2001 | Sokolihs et al. | |
| 6,371,682 B1 | 4/2002 | Maughan | |
| 6,536,779 B1 | 3/2003 | Maughan et al. | |
| 6,644,671 B1 | 11/2003 | Maughan et al. | |
| 6,652,179 B2 | 11/2003 | De Freitas | |

(Continued)

FOREIGN PATENT DOCUMENTS

WO    WO 01/42670 A2    6/2001

(Continued)

*Primary Examiner*—Michael P Ferguson
(74) *Attorney, Agent, or Firm*—Law Offices of Rita C. Chipperson, P.C.

(57) ABSTRACT

Dust boot assemblies for providing grease relief while preventing or minimizing infiltration of contaminants into a cavity in the dust boot and between the surfaces of a greased joint coupled to the dust boot. Some such dust boot assemblies include two-piece grease relief inserts having a body and a shield, wherein the body includes grease relief route(s) and the shield prevents or minimizes infiltration of contaminants into the grease relief route(s). Other dust boot assemblies include one-piece grease relief inserts with integral body and shield components. Some grease relief routes include axial and radial channels. Grease relief inserts are inserted under an edge of a dust boot. A dust boot skirt covers grease relief ports through which excess grease is relieved to the external environment. The grease relief insert is located to in a portion of the dust boot experiencing limited or zero movement.

10 Claims, 5 Drawing Sheets

U.S. PATENT DOCUMENTS

| | | |
|---|---|---|
| 6,955,607 B2 | 10/2005 | Iwano et al. |
| 7,040,833 B2 | 5/2006 | Kondoh |
| 7,063,331 B2 | 6/2006 | Iwano |
| 7,144,182 B1 | 12/2006 | Jordan et al. |
| 7,195,398 B2 | 3/2007 | Budde et al. |
| 7,237,978 B2 | 7/2007 | Fischer et al. |
| 2006/0120648 A1 | 6/2006 | Katae |
| 2007/0059092 A1 | 3/2007 | Elterman et al. |

FOREIGN PATENT DOCUMENTS

| | | |
|---|---|---|
| WO | WO 01/89866 A1 | 11/2001 |
| WO | WO 02/47925 A2 | 6/2002 |
| WO | WO 2005/089270 A2 | 9/2005 |
| WO | WO 2006/110133 A1 | 10/2006 |
| WO | WO 2006/127707 A2 | 11/2006 |
| WO | WO 2007/025170 A3 | 3/2007 |
| WO | WO 2007/025171 A2 | 3/2007 |
| WO | WO 2007/035821 A2 | 3/2007 |
| WO | WO 2007/084901 A2 | 7/2007 |

* cited by examiner

DUST BOOT ASSEMBLIES AND APPARATUS FOR PROVIDING GREASE RELIEF FOR A DUST BOOT

BACKGROUND OF THE INVENTION

Embodiments of the present invention generally relate to dust boots assemblies and apparatus for providing grease relief for a dust boot. More specifically, the present invention relates to dust boot assemblies and apparatus for providing grease relief for dust boots coupled to greasable joints such as ball-and-socket joints.

Many joint assemblies and compatible dust boots exist for coupling to one or more components (e.g., automobile chassis components). An example of one such prior art joint assembly and compatible dust boot for use with an outer tie rod end of an automobile chassis is depicted in FIG. 2. Specifically, joint assembly 110' is a ball-and-socket joint assembly, and it is depicted coupled to body 106' of an outer tie rod end.

Often, dust boots such as dust boot 108' are coupled to a joint assembly to prevent dirt, dust, water, mud, moisture, and other contaminants from infiltrating the joint and/or the grease present in the joint since such infiltration typically decreases the service life of the joint. Such dust boots typically include a main body such as dust boot body 150'. In the depicted embodiment, dust boot body 150' has an ovate shape, however, dust boots having alternate shapes including, but not limited to, conical, dome-shaped, hemi-spherical, spherical, and accordion-shaped are also known.

Many such bodies include first and second apertures such as first and second apertures 126' and 152', respectively, to facilitate coupling of dust boot 108' to a joint, a joint assembly, and/or a component coupled thereto (collectively referred to hereinafter as non-dust boot components) while allowing an extension of the non-dust boot component to pass therethrough. Alternate dust boot bodies include an aperture designed to mate with a flanged portion of the housing to which it will be coupled (e.g., the joint housing, joint assembly housing, or the housing of a component coupled thereto).

Coupling of a dust boot to a non-dust boot component may be performed using a variety of methods. One such method is to perform such coupling via one or more O-rings, clamping rings, and/or combinations thereof, which encircle or are otherwise affixed to the exterior portion of the dust boot in contact with the non-dust boot component such that the dust boot is held to the non-dust boot component. For example, such O-rings, clamping rings (e.g., duplex clamping ring 124'), and/or combinations thereof may surround the exterior portion of a dust boot aperture such as first and second apertures 126' and 152'. Alternatively, such coupling may be performed via inclusion of metal rings, plastic rings, or the like internal to the portion of the dust boot encircling or otherwise affixed to the non-dust boot component (e.g., internal metal ring 156' or a plastic ring similar thereto).

In the exemplary prior art embodiment depicted in FIG. 2, dust boot 108' is coupled to body 106' and joint assembly 110' by passing ball extension 154' of assembly 110' through first aperture 126' of dust boot 108' until second aperture 152' of dust boot 108' rests atop body 106'. It should be noted that in the embodiment depicted in FIG. 2, the inwardly facing surface of first aperture 126' and the inwardly facing surface of second aperture 152' (i.e., the inwardly facing surface of lip 128' as discussed in greater detail below) have been specifically configured to mate with the outwardly facing surfaces of the portions of the non-dust boot components to which they will be coupled, namely, ball extension 154' and the upper end of body 106', respectively. This type of mating configuration is commercially known and it allows dust boot 108' to be tightly coupled to ball extension 154' and the upper end of body 106' via internal metal ring 156' (or a plastic ring similar thereto) and duplex clamping ring 124', respectively, as depicted in FIG. 2. This tight coupling prevents or minimizes the potential of infiltration of contaminants into the joint at the locations of such couplings.

In dust boot 108' depicted in FIG. 2, the inwardly facing surface of second aperture 152' includes lip 128' to, inter alia, reinforce the strength and integrity of the seal between dust boot 108' and body 106'. Lip 128' includes axial and radial components 158' and 160', respectively, located perpendicular to each other. Axial component 158' has sufficient height to allow a coupler (e.g., a simplex clamping ring, a duplex clamping ring, a desired quantity of O-rings or the like) to encircle same, wherein the coupler is located below the portion of dust boot body 150' coupled to the distal end of axial component 158' and located above radial component 160'. In the depicted embodiment, the height of axial component 158' accommodates the placement of duplex clamping ring 124' on the external surface thereof. Radial component 160' provides a stop that prevents duplex clamping ring 124' from sliding, or otherwise disengaging, from the external surface of axial components 158'. Since dust boot body 150' includes lip 128' located at the inwardly facing surface of second aperture 152', the outwardly facing surface of body 106' is coupled to the inwardly facing surface of lip 128' via the method described above. However, dust boots without lips 128' are commercially available and such dust boots are compatible with the present invention as discussed in greater detail below. In such scenarios, the outwardly facing surface of the non-dust boot component is simply coupled to the inwardly facing surface of the non-lipped edge of second aperture 152'.

Some such joint assemblies, including joint assembly 110', are greasable (i.e., it is possible to add grease to the joint). Greasing the joint lubricates the joint, thereby facilitating smooth movement of same as such joints are typically made of metal and/or plastic components and, therefore, such joints involve metal to metal contact, plastic to plastic contact, and/or metal to plastic contact. For example, if the joint is a ball-and-socket joint, greasing facilitates smooth movement of the ball relative to the socket and it reduces the friction exerted upon the surfaces of the ball and socket by each other. Greasing of the joint also extends the service life of the joint and helps to expel any dirt, moisture, or other contaminants that may have entered the joint. Greasing also beneficially expels grease which has been previously injected into the joint as such grease tends to thin and otherwise spoil over time.

Dust boots having one or more apertures through a wall of the dust boot such as grease relief aperture 168' also exist. Such apertures are intended to provide an aperture through which excess grease may exit the internal cavity of the dust boot when over-greasing occurs. In the joint assembly 110' depicted in FIG. 2, grease may be added to the joint via injection of the grease through grease injection port 112' using commercially known methods. Grease input through grease injection port 112' enters assembly cavity 114' and, upon inputting of a sufficient quantity of grease, the grease is forced between the surfaces of ball 116' and first and second socket sections 118' and 119', respectively, thereby lubricating the external surfaces thereof. Upon injection of a large quantity of grease, the grease will pass around approximately the entire perimeter of ball 116' as depicted by arrows 120', the latter of which indicate a typical grease flow. When an excess quantity of grease is injected through grease injection port 112' (i.e., the joint is over greased), the excess grease exits the area located between the surfaces of ball 116' and first and second socket sections 118' and 119', respectively, and enters boot cavity 122'. Over greasing is often performed intentionally to remove existing, older grease from the joint. If a quantity of grease is injected through grease injection port 112' that exceeds the combined capacity of assembly cavity 114', the area between the surfaces of ball 116' and first and second socket sections 118' and 119', respectively, and boot cavity 122', grease relief aperture 168' allows the excess grease to be relieved from boot cavity 122' as depicted by arrows 120'. However, in addition to allowing grease to exit the internal cavity of the dust boot (e.g., boot cavity 122'), apertures such as grease relief aperture 168' also typically allow contaminants to enter the internal cavity of the dust boot from the environment surrounding the dust boot (e.g., with automobile chassis components, this environment includes mud, water, dirt, dust, and the like present on the roadways), whereupon these contaminants often enter the area between the surfaces of the ball and socket, thereby decreasing the service life of the joint.

Other types of pressure relief boot seals are known for use with joint assemblies such as ball-and-socket type joint assembles. One such boot seal includes a rigid collar member molded into a resilient body member, wherein the rigid collar member has radial and thrust bearing surfaces. The rigid collar member includes axial and radial grooves surrounding the entire periphery of the rigid collar that allow grease present internal to the boot seal to flow to a chamber located between the rigid collar member, a sealing lip, and a component to which the joint assembly is coupled. Upon an accumulation of excess grease internal to this chamber, the sealing lip deflects to allow the grease in the chamber to pass between the sealing lip and the component to which the joint assembly is coupled.

BRIEF SUMMARY OF THE INVENTION

Briefly stated, in one aspect of the present invention, a grease relief assembly including at least one grease relief route for relieving excess grease from within a dust boot of a ball joint assembly is provided. The grease relief assembly includes: a joint housing including a body having an annular peripheral surface and an internal housing cavity having an opening; a ball pin including a ball pivotably received within the housing cavity and a ball extension extending from the opening of the housing cavity; a grease relief insert including an insert body having a trunk having a first trunk end and a second trunk end and two radial flanges, a first of the two radial flanges coupled to the first trunk end and a second of the two radial flanges coupled to the second trunk end; a dust boot including a dust boot body defining a dust boot cavity for receiving grease and having a first end sealingly coupled to the annular peripheral surface of the housing and a second end sealingly engaging the ball extension, the dust boot body defining a dust boot aperture bounded by a first edge at the first end of the dust boot, the dust boot including a covering connected to and extending along at least a portion of the periphery of the first edge, an inwardly facing surface of the covering being matingly coupled to an outwardly facing surface of the second radial flange of the grease relief insert, the ball extension extending within the dust boot cavity and from the second end of the dust boot and at least one grease relief route being defined between the grease relief insert and the annular peripheral surface of the housing, each grease relief route being defined by a respective axial channel recessed in an inner wall of the trunk of the grease relief insert and extending through the two radial flanges and a respective radial channel recessed in an outer surface of the second radial flange, an inner end of the radial channel intersecting an end of the axial channel, the inwardly facing surface of the covering sealingly mating with an outer end of the radial channel distal the axial channel prior to an introduction of the excess grease; wherein excess grease within the bust boot cavity is vacated from the dust boot by passing into a first end of the grease relief route defined at an end of the axial channel distal the radial channel and passing through and vacating the grease relief route at the outer end of the radial channel.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
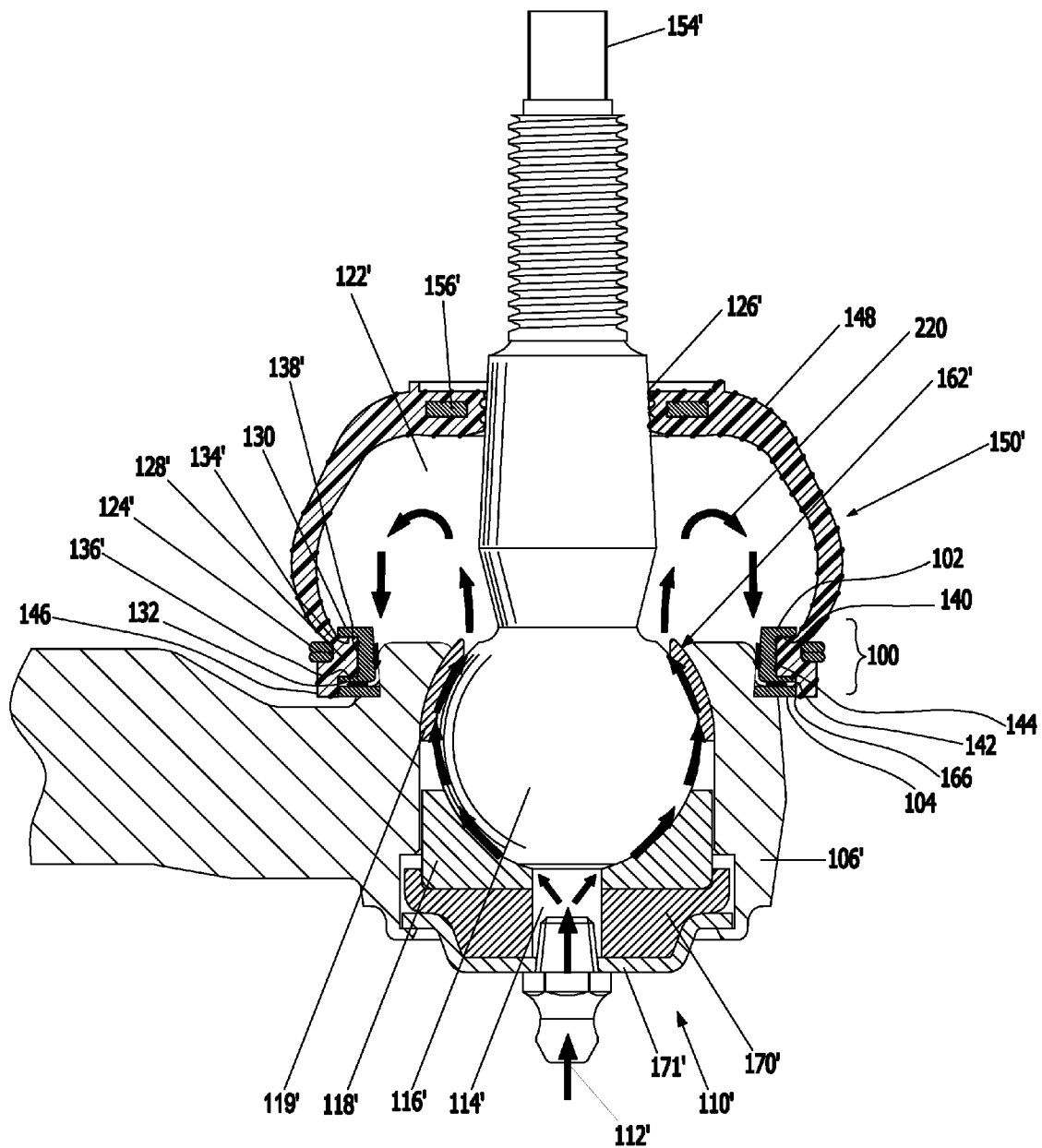
FIG. 1 is a vertical, cross-sectional view, with parts in elevation, of a dust boot assembly in accordance with one embodiment of the present invention coupled to the body of an outer tie rod end and the ball-and-socket joint assembly of FIG. 2, wherein the dust boot assembly includes a grease relief insert and the cross-sectional cut is made through the midpoints of the axial and radial channels of the grease relief insert.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, the inventors also contemplate aspects of the invention described by the plural of that term. As used in this specification and in the appended claims, the singular forms "a", "an" and "the" include plural references unless the context clearly dictates otherwise. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Figure 2:
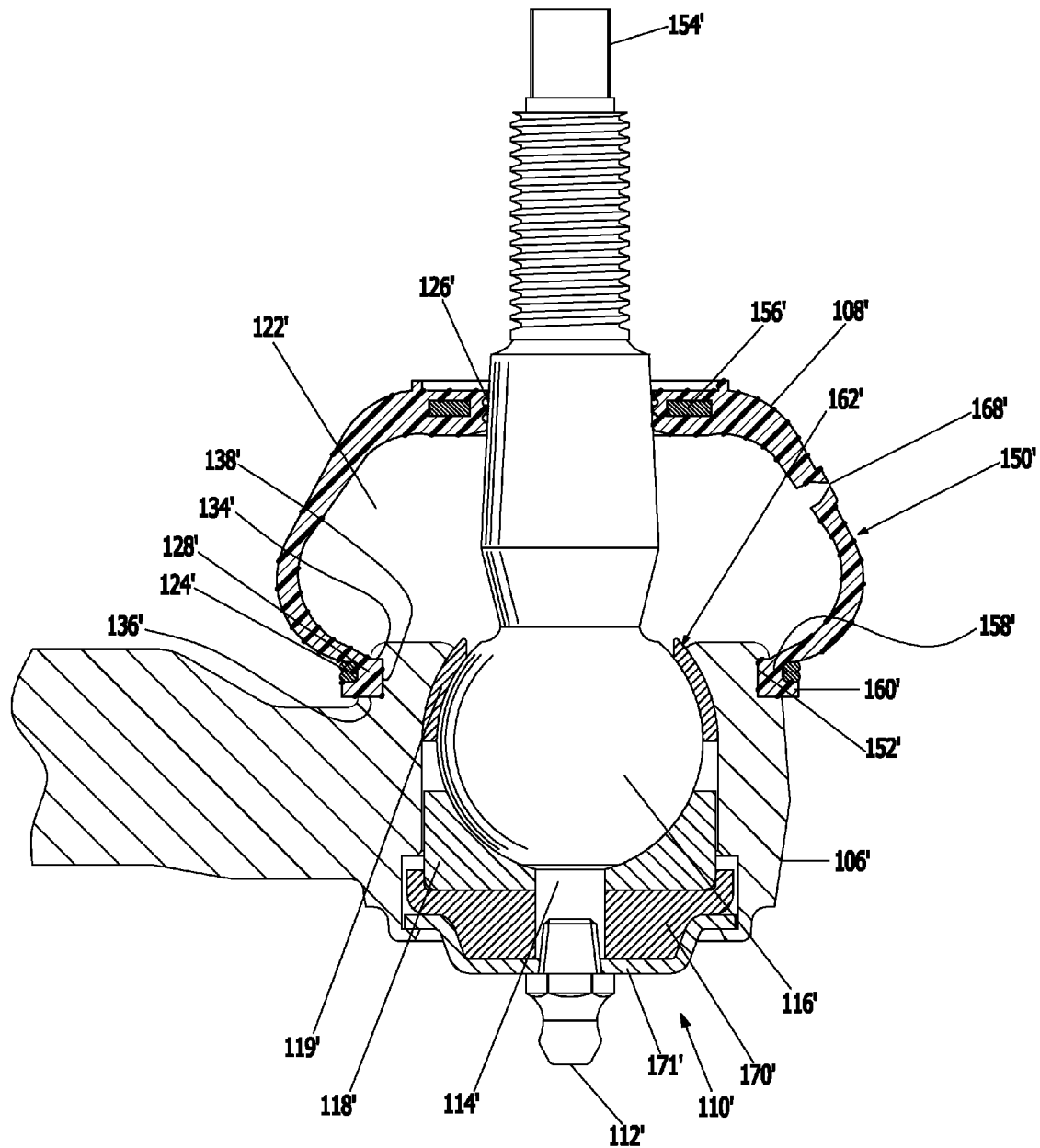
FIG. 2 is a vertical, cross-sectional view, with parts in elevation, of an exemplary coupling of the body of a commercially available outer tie rod end to a commercially available dust boot and ball-and-socket joint assembly in accordance with the prior art.

Referring first to FIG. 1, depicted is a vertical, cross-sectional view, with parts in elevation, of a dust boot assembly in accordance with one embodiment of the present invention coupled to body 106' of an outer tie rod end, wherein the dust boot assembly includes grease relief insert 100 and the cross-sectional cut is made through the midpoints of axial and radial channels 404 and 410, respectively, (FIGS. 4A-4C) of grease relief insert 100. It should be noted that all components in FIG. 1 having numeric identifiers followed by the prime symbol are identical to the components of FIG. 2 having the same numeric identifiers, and the latter components have been discussed above in greater detail in the Background of the Invention section.

Dust boot 148 is similar to dust boots known in the art such as dust boot 108' (FIG. 2) with the exception that dust boot 148 includes a covering in accordance with one embodiment of the present invention, wherein the covering covers one or more grease relief exit ports as discussed in greater detail below. In one aspect of the present invention, the covering is in the form of skirt 146, which is fabricated from the same elastic material from which dust boot body 150' of dust boot 148 is fabricated. Such material may include, but is not limited to, CR (e.g., polychloroprene, neoprene, etc.), NR (e.g., natural rubber, Polyisoprene, etc.), TPUR (i.e., thermoplastic polyurethane rubber), NBR (i.e., nitrile-butadiene rubber), silicon (i.e., thermoset polycondensate), and PVC (e.g., polyvinylchloride, thermoplastic polymer, etc.). However, alternate embodiments are envisioned in which different materials are used for the skirt and boot.

Additionally, in the depicted embodiment of the present invention, skirt 146 is a tubular skirt that extends from the edge of second aperture 152' around its entire periphery and skirt 146 has a thickness approximately equal to the thickness of lip 128'. This thickness is provided to minimize the cost of manufacturing. However, alternate thicknesses may be substituted without departing from the scope of the present invention.

The tubular configuration of skirt 146 is selected to allow the inwardly facing surface (i.e., those surfaces facing toward body 106', ball 116', and first and second socket sections 118' and 119', respectively) thereof to mate with the outwardly facing surface (i.e., those surfaces facing away from body 106', ball 116', and first and second socket sections 118' and 119', respectively) of second radial flange 132 and insert shield 104. Prior to the introduction of excess grease into cavity 122', this mating allows the inwardly facing surface of skirt 146 to cover the grease relief exit ports 166 (i.e., the outer ends of radial channels 410), which pass through the outwardly facing surface of second radial flange 132, to prevent, or minimize, the infiltration of contaminants into grease relief exit ports 166 and radial channels 410. In turn, prevention or minimization of the presence of contaminants in grease relief exit ports 166 and radial channels 410 prevents or minimizes the presence of contaminants in axial channels 404, boot cavity 122', and between the surfaces of ball 116' and first and second socket sections 118' and 119', respectively, as such contaminants are completely prohibited, or are at least impeded, from passing into these areas from the exterior environment via grease relief exit ports 166 and radial channels 410. Although skirt 146 is depicted in FIGS. 1 and 3-5B as tubular, other configurations of skirt 146 may be substituted so long as such configurations are capable of mating with at least a portion of the outwardly facing surface of the grease relief insert such that any channels/routes passing through this outwardly facing surface are covered. For example, skirt 146 may include a plurality of spaced flanges or flaps, wherein such flanges or flaps are located to cover the grease relief ports of the grease relief insert with which the skirt, and its associated dust boot, will be used. Furthermore, although skirt 146 is depicted as extending around the entire periphery of the edge of second aperture 152', skirts extending around less than the entire periphery of this edge are also envisioned without departing from the scope of the present invention. Also, alternate embodiments of skirt 146 are envisioned in which an external coupler (e.g., an O-ring, clamping ring, or the like) may be added around the exterior surface of skirt 146 and/or an internal coupler (e.g., an internal metal or plastic ring mounted) may be included internal to skirt 146. In some such embodiments, the coupler may be located in the area of grease relief ports 166, however, such location is not required to achieve the purposes of the present invention.

If an excess quantity of grease is injected into boot cavity 122', the force exerted by the oversupply of grease in such cavity forces a portion of the grease into one or more of radial channels 410 via axial channels 404. This force continues to force the excess grease through one or more radial channels 410 until it reaches the respective grease relief ports 166, whereupon the grease is forced against the inwardly facing surface of skirt 146 in contact with such grease relief ports 166. This path of the grease is depicted by arrows 220. The elasticity of skirt 146 allows the skirt to be expanded and/or deflected only to the degree necessary to accommodate relief of the excess grease present in boot cavity 122', axial channel(s) 404, and radial channel(s) 410 into the environment external to the dust boot assembly, body 106', and joint assembly 110' via grease relief exit ports 166. The presence of the grease between the inwardly facing surface of skirt 146 and grease relief ports 166 prevents, or minimizes, the infiltration of contaminants into grease relief exit ports 166 and radial channel(s) 410 while skirt 146 is in its expanded and/or deflected state. Furthermore, as soon as grease is no longer present between these surfaces, the elasticity of skirt 146 will cause it to partially or fully return to its original position in which it covers grease relief exit ports 166, thereby preventing, or minimizing, the infiltration of contaminants into grease relief exit ports 166 and radial channels 410 and, therefore, axial channels 404, boot cavity 122', and the area located between the surfaces of ball 116' and first and second socket sections 118' and 119', respectively.

The relatively small, almost nonexistent, area between the inwardly facing surface of skirt 146 and the outwardly facing surface of grease relief ports 166 further minimizes, or eliminates, the potential for contaminant infiltration due to the small surface area into which such contaminants must pass.

Additionally, the incorporation of two relatively small grease relief exit ports 166 further minimizes, or eliminates, the potential for contaminant infiltration as such contaminants must penetrate below the inwardly facing surface of skirt 146 in the vicinity of one of grease relief exit ports 166. However, alternate embodiments of the present invention are envisioned having a greater or lesser quantity of grease relief exit ports 166.

Also, since grease is relieved via grease relief exit port 166 of insert body 102 and an inwardly facing surface of skirt 146 of dust boot 148, the dust boot assembly of the present invention may be used in conjunction with a larger quantity of commercially available non-dust boot components. That is, in this embodiment of the present invention, grease relief is not dependent upon, and does not occur, adjacent a surface of the non-dust boot component. Therefore, the sizes, shapes, and configurations of the non-dust boot component may change without the need for alteration of the grease relief exit ports and covering skirts of the present invention.

Furthermore, although dust boot 148 and skirt 146 are depicted in FIG. 1 as a single unit, skirt 146 may alternatively be fabricated as an independent unit that is coupled to dust boot 148 without departing from the scope hereof.

Although the grease relief insert of the present invention is discussed herein for use with a dust boot having skirt-type grease relief exit port coverings, other grease relief exit port coverings may be substituted without departing from the scope of the present invention. For example, a portion of the dust boot (e.g., a skirt or a non-skirt portion) located adjacent to the grease relief exit ports (e.g., grease relief exit ports 166) may be reinforced with a coupler including, but not limited to, an elastic O-ring, clamping ring, internal metal or plastic ring, or the like, wherein the elasticity of the ring allows this portion of the dust boot to expand and contract as necessary to accommodate grease relief in the same manner as the non-reinforced skirt (i.e., skirt 146) as discussed in greater detail above. In another example, the covering may be a reinforced or non-reinforced portion of the dust boot (e.g., a skirt or a non-skirt portion) located adjacent to the grease relief exit ports (e.g., grease relief exit ports 166) that includes a uni-directional valve or valve-like device that allows grease expelled from grease relief exit ports to pass through the valve without allowing grease or other contaminants to pass from the exterior of the dust boot to the interior thereof. Or, the covering may be a uni-directional valve located in the outwardly facing surface of the insert body in the grease relief exit port.

The location of skirt 146 or an alternative grease relief exit port covering (e.g., a reinforcing ring, a valve, etc.) in a position that extends around the periphery of the edge of second aperture 152' places skirt 146 such that it is least likely to be affected by the movement of boot 148 along with the movement of ball 116' and ball extension 154'. As can best be seen with reference to FIG. 1, as ball 116' rotates or leans within first and second socket sections 118' and 119', respectively, ball extension 154' rotates in conjunction therewith. As ball extension 154' rotates, the portion of boot coupled thereto via duplex clamping ring 124' also rotates therewith. Using commercially known methods, dust boot body 150' is configured to accommodate rotation of this end of boot 148 while maintaining the coupling between lip 128' and body 106'. That is, dust boot body 150' is designed to limit the stress placed on lip 128' or a similar portion of the boot located at the edge of second aperture 152' to help lip 128' stay coupled to body 106'. Consequently, placement of skirt 146 or an alternative grease relief exit port covering in a location on the opposite side of lip 128' from the rotating side thereof, minimizes, or eliminates, the stress exerted upon skirt 146 or the alternative grease relief exit port covering as well as the motion thereof. Therefore, this location of skirt 146 or the alternative grease relief exit port covering minimizes, or eliminates, the potential that contaminants will infiltrate between the inwardly facing surface of skirt 146 or the alternative grease relief exit port covering and the outwardly facing surface of grease relief insert 100 due to deflection or deformation of such inwardly facing surface that is caused by stress or motion of skirt 146 or the alternative grease relief exit port covering due to forces other than the pressure of grease being relieved from boot cavity 122'.

Also depicted in FIG. 1 is one embodiment of grease relief insert 100 in accordance with one embodiment of the present invention. Grease relief insert 100 is inserted into second aperture 152' such that it may be coupled between body 106' and dust boot 148 to provide a grease relief mechanism for excess grease present in boot cavity 122'. The grease relief mechanism of the present invention prevents, or minimizes, the infiltration of contaminants into boot cavity 122' and/or the area located between the surfaces of ball 116' and first and second socket sections 118' and 119', respectively, thereby increasing the service life of joint assembly 110'.

Figure 3:
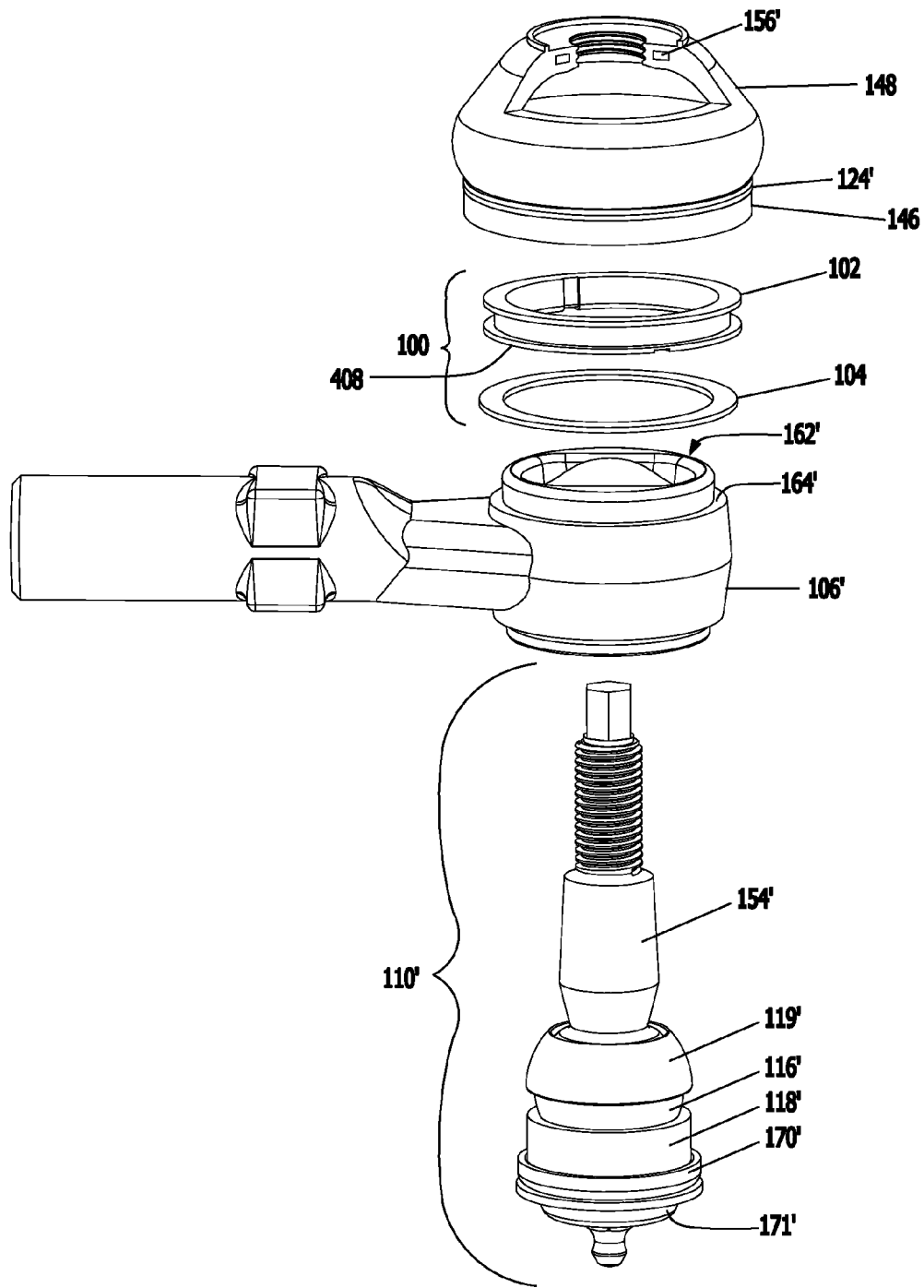
FIG. 3 is an exploded perspective view of the assembled components depicted in FIG. 1.
Figure 4A:
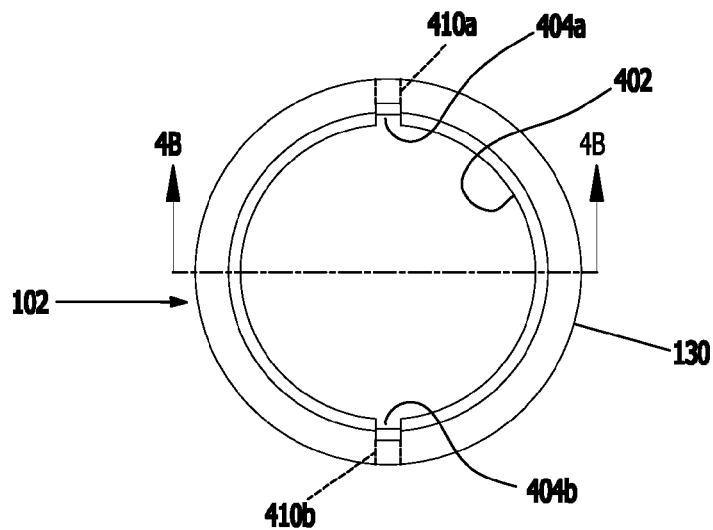
FIG. 4A is a top plan view of the insert body of the grease relief insert of FIGS. 1 and 3.
Figure 4B:
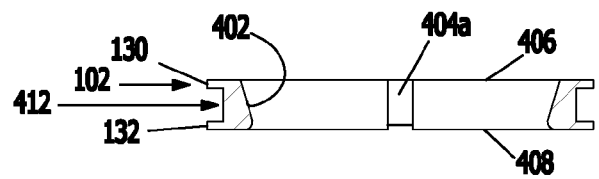
FIG. 4B is a cross-sectional view of the insert body depicted in FIG. 4A taken along lines 4B-4B of FIG. 4A.
Figure 4C:
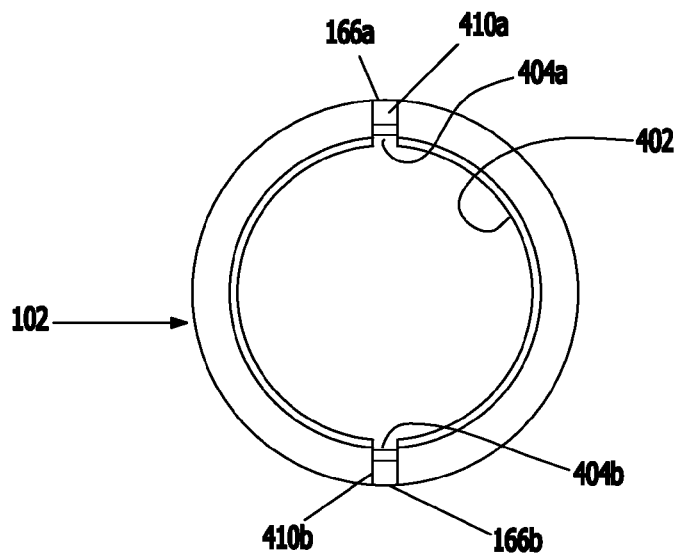
FIG. 4C is a bottom plan view of the insert body of the grease relief insert of FIGS. 1 and 3.

Referring now to FIGS. 4A and 4B, depicted are a top plan view of insert body 102 of grease relief insert 100 and a cross-sectional view of insert body 102 taken along lines 4B-4B of FIG. 4A. In the embodiment of the present invention depicted in FIGS. 1 and 3-5B, grease relief insert 100 includes two components, namely, insert body 102 and insert shield 104.

As best seen in FIG. 4B, insert body 102 includes trunk 412' having first and second radial flanges 130 and 132, respectively, to facilitate coupling of the outwardly facing surfaces of insert body 102 with the inwardly facing surfaces of dust boot 108', or more specifically, lip 128' thereof. That is, as better depicted in the assembled view of FIG. 1, first and second radial flanges 130 and 132, respectively, are designed to mate with lip 128', which protrudes inwardly from the inwardly facing surface of dust boot 108'. First and second radial flanges 130 and 132, respectively, allow such mating to occur between three distinct surfaces of insert body 102 and lip 128', thereby providing a better seal. More specifically, the flanged configuration of insert body 102 allows lower surface 140 of first radial flange 130, upper surface 142 of second radial flange 132, and outwardly facing surface 144 of trunk 412 to mate with upper surface 134' of lip 128', lower surface 136' of lip 128', and inwardly facing surface 138' of lip 128', respectively. This seal is further secured by the mounting of duplex clamping ring 124 around the external surface of dust boot 108' that surrounds lip 128'. This secure seal maintains insert body 102 in the desired location as pressure is exerted on same via any one of a number of forces including, but not limited to, forces exerted by grease exiting cavity 122' of dust boot 108' and forces exerted by movement of body 106', ball 116', and/or first and second socket sections 118' and 119', respectively. However, alternate embodiments of the present invention without flanges, with a varying quantity of flanges, and/or with flanges having varying shapes are envisioned. Furthermore, any design of the outwardly facing surfaces of insert body 102 that facilitates mounting of insert body 102 to the inwardly facing surfaces of a particular dust boot, whether flanged or flange less, may be substituted without departing from the scope of the present invention. Along these lines, although insert body 102 is depicted having a tubular trunk 412' and circular first and second radial flanges 130 and 132, respectively, insert bodies having non-tubular and/or non-circular sections (e.g., ovate sections, rectangular sections, etc.) are also envisioned without departing from the scope of the present invention.

As depicted in FIG. 4A, the outer circumference of first radial flange 130 is substantially circular. The inner circumference of inner wall 402 of insert body 102 is slightly conical in that inner wall 402 tapers slightly radially inward as it extends from first body end 406 (FIG. 4B) of insert body 102 to second body end 408 (FIG. 4B) of insert body 102. That is, the inner diameter of first body end 406 (FIG. 4B) is larger than the inner diameter of second body end 408 (FIG. 4B). This tapered conical shape is designed to mate with the inversely tapered outwardly facing surfaces of body 106' passing into or through second aperture 152'. In other words, the outwardly facing surface of body 106' tapers inward as it progresses away from the end of such surface adjacent boot cavity 122' in an inverse manner to the tapering of inner wall 402. The coupling of the tapered inner walls 402 to the inversely tapered surfaces of body 106' increases the tightness of the fit between these two components, thereby minimizing the potential that insert body 102 will disengage from body 106', for example, due to the application of a vertical force thereto. That is, when forces are applied to the coupling of body 106' to body insert 102, the smaller inner diameter of second body end 408 and the surface of body 106' adjacent thereto prevents movement of body insert 102' in the direction of boot cavity 122' since the smaller inner diameter of second body end 408 is not able to pass over the larger outer diameter of the adjacent outwardly facing surface of body 106'.

Also depicted in FIG. 4A is a pair of axial channels 404a and 404b. These axial channels extend vertically throughout the entire height of inner walls 402. Although axial channels 404 are depicted as having a substantially semi-rectangular cross-section, varying channel shapes may be substituted without departing from the scope of the present invention including, but not limited to, axial channels having semi-square, semi-circular, U-shaped, and V-shaped cross-sections. A channel having any shape that allows grease to pass therethrough may be substituted without departing from the scope of the present invention.

This amendment is made to correct a typographical error in which the word vertically was replaced with the word horizontally. No new matter has been entered.

Insert body 102 also includes radial channels 410, as depicted in FIGS. 4A and 4B. Hidden views of these channels are also shown in FIG. 4A. Radial channel 410b is a mirror image of radial channel 410a. As depicted, radial channels 410a and 410b pass throughout the full width of their respective portions of second radial flange 132. Additionally, the innermost ends of radial channels 410a and 410b intersect with the ends of axial channels 404a and 404b, respectively, present in second radial flange 132. Furthermore, radial channels 410a and 410b are located perpendicular to axial channels 404a and 404b, respectively. The incorporation of perpendicular channels in insert body 102 facilitates incorporation of a thicker wall for trunk 412 therein, which minimizes the potential for cracking or other damage to insert body 102. However, alternate non-perpendicular channel configurations (e.g., diagonal, angled, etc.) that allow grease to exit boot cavity 122' may be substituted without departing from the scope of the present invention. Virtually any channel configuration that provides a grease relief route from boot cavity 122' to a grease relief port may be substituted.

As best depicted in the assembled view of FIG. 1 and more fully described in reference thereto, the relative configuration of these intersecting channels combines each pair of channels to form single grease relief routes through which grease may exit boot cavity 122' via grease relief exit ports 166. That is, axial channel 404a and radial channel 410a combine to form a first grease relief route and axial channel 404b and radial channel 410b combine to form a second grease relief route. Although insert body 102, and therefore grease relief insert 100, are depicted as including two grease relief routes, a lesser or greater quantity of grease relief routes may be substituted without departing from the scope of the present invention.

Figure 5A:
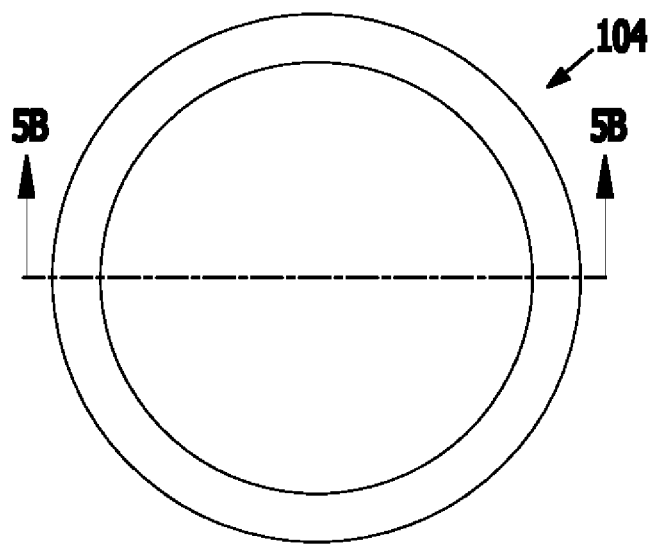
FIG. 5A is a top plan view of the insert shield of the grease relief insert of FIGS. 1 and 3.
Figure 5B:
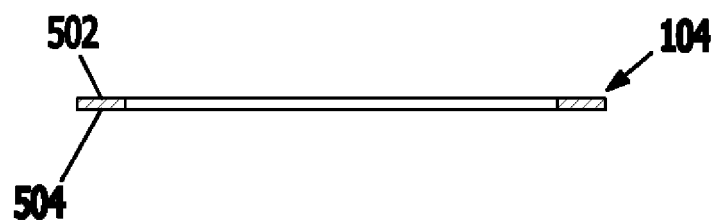
FIG. 5B is a cross-sectional view of the insert shield depicted in FIG. 5A taken along lines 5B-5B of FIG. 5A.

Turning next to FIGS. 5A and 5B, depicted are a top plan view of insert shield 104 and a cross-sectional view of insert shield 104 taken along lines 5B-5B of FIG. 5A, respectively. As shown, insert shield 104 is a relatively flat circular ring. The width and height of insert shield 104 are approximately equal to the width and height, respectively, of second radial flange 132, however, varying dimensions for insert shield 104 may be substituted without departing from the scope of the present invention. When varying the height of insert shield 104, it is important to note that a greater height of insert shield 104 decreases the surface area of the mating surfaces of insert body 102 and body 106', which could cause one or more components of grease relief insert 100 to disengage from its desired position unless the height of body 106' is also increased. However, increasing the height of body 106' may undesirably limit the rotation of ball 116' and its associated ball extension 154'. Consequently, any variation of the height of insert shield 104 should take these factors into consideration.

The shape and size of insert shield 104 relative to second radial flange 132 allows ring 104 to be positioned adjacent second body end 408 of second radial flange 132. Such positioning allows insert shield 104 to form a cover for the pair of axial and radial channels 404 and 410, respectively. That is, when insert shield 104 is positioned directly below second body end 408, radial channel 410 and the ends of axial channels 404 passing through second body end 408 are not open to the environment located below second body end 408. The covering aspect of insert shield 104 prevents, or minimizes, infiltration of contaminants into grease relief exit ports 166 and axial and radial channels 404 and 410, respectively. In turn, prevention or minimization of contaminants in grease relief exit ports 166 and axial and radial channels 404 and 410, respectively, prevents or minimizes the presence of contaminants in boot cavity 122' and between the surfaces of ball 116' and first and second socket sections 118' and 119', respectively, as such contaminants do not pass into these areas from the exterior environment via grease relief exit ports 166 and axial and radial channels 404 and 410, respectively.

In the depicted embodiment of the present invention, both insert body 102 and insert shield 104 are formed of Polyacetal. However, insert body 102 and/or insert shield 104 may be manufactured from a polymer other than Polyacetal or another relatively rigid material including, but not limited to, plastic, nylon, Teflon®, and metal.

Furthermore, although the embodiment of the present invention depicted in FIGS. 1 and 3-5B depicts grease relief insert 100 as a combination of two pieces (i.e., insert body 102 and insert shield 104), alternate embodiments of the grease relief inserts of the present invention are envisioned in which such grease relief inserts are a single unit. For example, insert shield 104 could be formed as a single unit with insert body 102 during the manufacturing process. In this embodiment, a single mold may be created for a single unit grease relief insert in which a first portion of the mold forms the shape of the insert shield (e.g., insert shield 102) and it is adjacent a second portion of the same mold that forms the insert shield (e.g., insert shield 104) in the same relative configuration in which the insert body would normally be positioned adjacent the insert shield.

In yet another alternate embodiment of the grease relief insert of the present invention, the insert body is used alone (i.e., without insert shield 104). In such embodiments, the surface of the non-dust boot component to which the dust boot assembly will be coupled includes a surface that resembles and/or performs the same function as the insert shield with which the insert body is typically used. For example, in an embodiment of the present invention in which the portion of the insert body that typically mates with the insert shield includes a flange having a circular inner and outer diameter as well as axial channel(s) and end(s) of radial channel(s) (such as the embodiment of the insert body depicted in FIGS. 1 and 3-5B), the surface of the non-dust boot component to which the insert body will be mounted must include a flat surface in the area that will be adjacent the axial channel(s) and the end(s) of the radial channel(s) to ensure that these channels are closed to the exterior environment and to further ensure that the intended grease relief route is formed. This flat surface could resemble the mating surface of the insert shield that is typically used in conjunction with the insert body or it could simply resemble as much of that surface as is required to perform the required function of the omitted insert shield (i.e., ensuring that the axial and radial channels are closed to the exterior environment and the intended grease relief route is formed). In this embodiment, insert body only includes a portion of the grease relief route and the non-dust boot component to which the insert body will be coupled also includes a portion of the grease relief route. In the exemplary embodiment detailed in this paragraph, insert body 102 includes the radial and axial channels and a portion of the walls of the grease relief route and the non-dust boot component (i.e., body 106') adds a portion of the walls of the radial and axial channels to the grease relief route.

In our exemplary outer tie rod end embodiment of the present invention, elimination of insert shield 104 involves widening the outer circumference of the outwardly facing surface of seat 164' (FIG. 3) to have the same diameter as the outer circumference of the outwardly facing surface of insert shield 104. This could be done by either widening the entire upper portion of the body 106' or by adding a flanged edge in place of seat 164'. One the outwardly facing surface of seat 164' has been re-configured to resemble the outwardly facing surface of insert shield 104, insert body 102 may be coupled directly to the outwardly facing surface of seat 164', thereby eliminating the need for insert shield 104. Dust boot 148 may be coupled to body 106' in the same manner with which it would have been coupled if insert shield 104 were not omitted.

Turning next to FIG. 3, depicted is an exploded perspective view of the individual components of the dust boot assembly depicted in FIG. 1, which includes dust boot 148', insert body 102, insert shield 104, and its coupling to body 106' and joint assembly 110'. As depicted, these components are easily assembled in the following manner.

Once joint assembly 110' has been assembled, ball extension 154' is passed through bore 162' of body 106' until a point at which the outwardly facing surface of second socket section 119' mates with the inwardly facing surface of the upper end of body 106'. This mating causes the downwardly facing surface of body 106' to form a seal with the upwardly facing surfaces of bearing 170'. Next, insert shield 104' is passed over ball extension 154' until at least an innermost portion of insert shield 104' rests upon seat 164' of body 106'. Next, insert body 102' is passed over ball extension 154' until second body end 408 is flush with the outwardly facing surface of insert shield 104.

Lip 128' and skirt 146 of dust boot 148 are then passed over and/or around insert body 102 and insert shield 104. That is, as most easily seen in the assembled cross-sectional view of FIG. 1, lip 128' is positioned such that its inwardly facing surfaces mate with the outwardly facing surfaces of insert body 102. In the depicted embodiment of the present invention, the flanged configuration of insert body 102 allows lower surface 140 of first radial flange 130, upper surface 142 of second radial flange 132, and outwardly facing surface 144 of trunk 412 to mate with upper surface 134' of lip 128', lower surface 136' of lip 128', and inwardly facing surface 138' of lip 128', respectively. In addition, skirt 146 is positioned such that its inwardly facing surface contacts the outwardly facing surfaces of insert shield 104 and second radial flange 132. In this position, internal metal ring 156' acts to secure dust boot 148 to ball extension 154'. Then, duplex clamping ring 124' is tightened around the exterior surfaces of dust boot 148 to secure dust boot 148 to body 106'. Finally, grease injection port 112' is coupled to the previously assembled components of joint assembly 110' via commercially known methods and/or methods provided by the manufacturer of joint assembly 110'.

In an embodiment of the present invention in which a one-piece grease relief insert is incorporated as detailed above, the same method of assembling the dust boot assembly depicted in FIG. 3 may be utilized with one exception. Since the one-piece grease relief insert of the depicted embodiment is just a combination of insert body 102 and insert shield 104, and therefore has all of the same surfaces, mating of the surfaces of the one-piece grease relief insert is the same as described above for the two-piece grease relief insert. However, in lieu of the two steps of installing an insert shield and installing the insert body, a single step of installing the grease relief insert is substituted. This method eliminates the need to mate the inwardly facing surface of the insert body with the outwardly facing surface of the insert shield.

In an embodiment of the present invention in which the grease relief insert is an insert body only, a similar method to the method of assembling the dust boot assembly depicted in FIG. 3 may be utilized by omitting the step of installing the insert shield. This step may be omitted because the non-dust boot component to which the dust boot assembly is coupled has a seat (such as seat 164') that has been modified to mate directly with the second body end of the insert body. In some aspects of the present invention, this modified seat forms a portion (e.g., a partial wall) of the grease relief route.

Although the foregoing method of assembling a dust boot assembly and coupling it to a body of a non-dust boot component (e.g., an outer tie rod end) and joint assembly is described with specificity, the same assembly and coupling may be performed via alternate steps without departing from the scope of the present invention. Furthermore, although FIG. 3 depicts a method of assembling a dust boot and grease relief insert of the present invention to a body of an outer tie rod end and a ball-and-socket joint assembly, alternate embodiments of the present invention are envisioned in which a dust boot and grease relief insert of the present invention are coupled to bodies of non-dust boot components other than outer tie rod ends and a ball-and-socket joint assembly including, but not limited to, stabilizer links, inner tie rod ends, ball joints, and automotive chassis parts having ball-and-socket style joints.

In addition to the other methods and apparatus of providing grease relief while preventing the infiltration of contaminants into boot cavity 122' and between the surfaces of ball 116' and first and second socket sections 118' and 119', respectively, discussed herein, the incorporation of one or more grease relief routes in a separate grease relief insert (e.g., grease relief insert 100) positioned in a portion of dust boot 148 that are designed to experience limited, or no, motion (e.g., second aperture 152') provides grease relief ports 166 and a sealing cover therefore (i.e., skirt 146) that do not move when ball 116' and its ball extension 154' move. Limited, or no, motion occurs for a plurality of reasons including, but not limited to, the flexible and elastic nature of the material of which grease relief insert 100 is made combined with the rigid nature of the adjacent metal non-dust boot components (e.g., body 106'), the conical shape of grease relief insert 100 and body 106', and the coupling action of duplex clamping ring 124'.

This limited motion is in contrast to other locations of dust boot body 150' (e.g., first aperture 126') that are designed to move with the movement of ball 116' and its ball extension 154'. Additionally, since grease relief insert 100 is a component that is separate and distinct from boot 148, it is less likely to move due to the typical movement of boot 148 during use, particularly the distal ends of boot 148 which move with the movement of ball 116' and ball extension 154'. Movement of grease relief exit ports 166 and/or the areas surrounding such ports (e.g., skirt 146) is sometimes undesirable as such movement may cause one or more grease relief exit ports 166 to open in the absence of grease pushing therethrough. Such opening potentially allows contaminants to infiltrate grease relief exit ports 166, radial channels 410, axial channels 404, boot cavity 122', and/or the surfaces between ball 116' and first and second socket sections 118' and 119', respectively. However, it should be noted that movement of grease relief exit ports 166 and/or the areas surrounding such ports (e.g., skirt 146) will not interfere with grease relief via grease relief exit ports 166.

Furthermore, although the dust boot assembly depicted in FIGS. 1 and 3-5B is depicted coupled to a body of an outer tie rod end and a ball-and-socket joint, alternate embodiments of the present invention are envisioned in which dust boot assemblies created in accordance with the present invention are coupled to the bodies of non-dust boot components other than outer tie rod ends and joint assemblies including, but not limited to, stabilizer links, inner tie rod ends, ball joints, and automotive chassis parts having ball-and-socket style joints.

Importantly, the apparatus and methods of the present invention allow currently known, commercially available dust boots to be easily and inexpensively modified to accommodate the apparatus and methods of the present invention. That is, the apparatus and methods of the present invention may be implemented by simply adding a skirt (e.g., skirt 146) to a commercially-known dust boot and placing a grease relief insert 100 under or internal to an aperture of the commercially known dust boot.

Additionally, since the grease relief insert of the present invention is made of a different material than that from which the boot of the present invention is made, the use of an independent grease relief insert simplifies, and decreases the cost of, the manufacturing process for boot as the boot may be simply molded, or otherwise fabricated, as a single unit of one homogenous material. This is typically less expensive than the cost of manufacturing a boot having two varying materials, for example, a boot in which the grease insert relief is molded or otherwise connected to the internal surface of the boot. However, embodiments of the present invention in which insert body and/or insert shield are fabricated integral to a boot are envisioned.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A grease relief assembly including at least one grease relief route for relieving excess grease from within a dust boot of a ball joint assembly, said grease relief assembly comprising:
   a joint housing including a joint housing body having an annular peripheral surface and an internal housing cavity having an opening;
   a ball pin including a ball pivotably received within said housing cavity and a ball extension extending from said opening of said housing cavity;
   a grease relief insert including an insert body having a trunk having a first trunk end and a second trunk end and two radial flanges, a first of said two radial flanges coupled to said first trunk end and a second of said two radial flanges coupled to said second trunk end;
   a dust boot including a dust boot body defining a dust boot cavity for receiving grease and having a first end sealingly coupled to said annular peripheral surface of said housing and a second end sealingly engaging said ball extension, said dust boot body defining a dust boot aperture bounded by a first edge at said first end of said dust boot, said dust boot including a covering connected to and extending along at least a portion of said periphery of said first edge, an inwardly facing surface of said covering being matingly coupled to an outwardly facing surface of said second radial flange of said grease relief insert, said ball extension extending within said dust boot cavity and from said second end of said dust boot and
   at least one grease relief route being defined between said grease relief insert and said annular peripheral surface of said housing, each grease relief route being defined by a respective axial channel recessed in an inner wall of said trunk of said grease relief insert and extending through said two radial flanges and a respective radial channel recessed in an outer surface of said second radial flange, an inner end of said radial channel intersecting an end of said axial channel, said inwardly facing surface of said covering sealingly mating with an outer end of said radial channel distal said axial channel prior to an introduction of said excess grease;
   wherein excess grease within said bust boot cavity is vacated from said dust boot by passing into a first end of said grease relief route defined at an end of said axial channel distal said radial channel and passing through and vacating said grease relief route at said outer end of said radial channel.

2. An assembly according to claim 1, wherein said grease relief insert further comprises:
   an insert shield, said insert shield shaped as a flat circular ring for placement adjacent a first surface of said insert body between said second radial flange and said joint housing body, said placement substantially perpendicular to said annular peripheral surface of said housing, wherein at least a portion of said at least one grease relief route passes adjacent said flat circular ring.

3. An assembly according to claim 2, wherein at least one of the group consisting of a height and a width of said insert shield is equivalent to a same dimension of at least one of said two radial flanges.

4. An assembly according to claim 1, wherein said axial channel is located substantially perpendicular to said radial channel.

5. An assembly according to claim 1,
   wherein said covering is selected from the group consisting of a non-reinforced tubular skirt, a tubular skirt reinforced with at least one coupler, a non-reinforced tubular portion of said dust boot body, and a tubular portion of said dust boot body reinforced with at least one coupler and wherein said non-reinforced tubular skirt or said tubular skirt reinforced with at least one coupler is one of the group consisting of a portion of a single unit that includes said dust boot body and an independent unit coupled to said dust boot body.

6. An apparatus assembly according to claim 1, wherein said covering is elastic.

7. An assembly according to claim 1, wherein said dust boot body includes a lip at said second end of said dust boot for sealingly engaging said ball extension.

8. An assembly according to claim 1, wherein a first inner diameter of said first of said two radial flanges is larger than a second inner diameter of said second of said two radial flanges; and wherein said inner wall of said trunk is tapered radially inward as it progresses from said first of said two radial flanges to said second of said two radial flanges to facilitate mating of said trunk with an inversely tapered surface of said annular peripheral surface of said joint housing.

9. An assembly according to claim 1, wherein said grease relief insert includes a first portion of said at least one grease relief route; and wherein said annular peripheral surface of said housing includes a second portion of said at least one grease relief route.

10. An assembly according to claim 9, wherein said second portion is a partial wall of said at least one grease relief route.

* * * * *